United States Patent [19]

Königs

[11] Patent Number: 5,404,988
[45] Date of Patent: Apr. 11, 1995

[54] MOBILE CONNECTING BELT BRIDGE FOR OPEN PIT MINING

[75] Inventor: Herbert Königs, Rheinberg, Germany

[73] Assignee: Krupp Fordertechnik GmbH, Franz-Schubert-Strasse, Germany

[21] Appl. No.: 140,041

[22] PCT Filed: Feb. 10, 1993

[86] PCT No.: PCT/EP93/00318
§ 371 Date: Nov. 12, 1993
§ 102(e) Date: Nov. 12, 1993

[87] PCT Pub. No.: WO93/16945
PCT Pub. Date: Sep. 2, 1993

[30] Foreign Application Priority Data

Feb. 24, 1992 [DE] Germany ............ 42 05 557.1

[51] Int. Cl.6 ............................................. B65G 21/10
[52] U.S. Cl. ........................................ 198/314; 198/588; 198/594; 299/64
[58] Field of Search ............... 198/303, 304, 311, 314, 198/588, 594; 299/18, 43–45, 64–67

[56] References Cited

U.S. PATENT DOCUMENTS

| | | | |
|---|---|---|---|
| 3,279,584 | 10/1966 | Towles | 198/311 |
| 4,589,701 | 5/1986 | Beckmann et al. | 299/64 |
| 4,730,716 | 3/1988 | Enneking et al. | 198/304 |
| 4,934,505 | 6/1990 | Rodenberg et al. | 198/314 |
| 5,165,757 | 11/1992 | Grathoff | 299/18 |

FOREIGN PATENT DOCUMENTS

| | | | |
|---|---|---|---|
| 3024180 | 1/1982 | Germany . | |
| 3642718 | 6/1988 | Germany . | |
| 3725595 | 2/1989 | Germany . | |
| 8802730 | 4/1988 | WIPO | 198/311 |

*Primary Examiner*—Joseph E. Valenza
*Attorney, Agent, or Firm*—Herbert Dubno; Yuri Kateshov

[57] ABSTRACT

The connecting belt bridge provided with the feed end side and the discharge side end each supported on their respective travelling means, the discharge side travelling means including a travelling unit which is not rail-bound, the connecting belt bridge being pivotally supported on the discharge side travelling means about a vertical as well as a horizontal axis and on the feed side travelling means by a longitudinally displaceable single point support including a support beam which can be horizontally aligned and has at its feed side end a feed jib hinged on by way of a horizontal transverse axis.

10 Claims, 6 Drawing Sheets

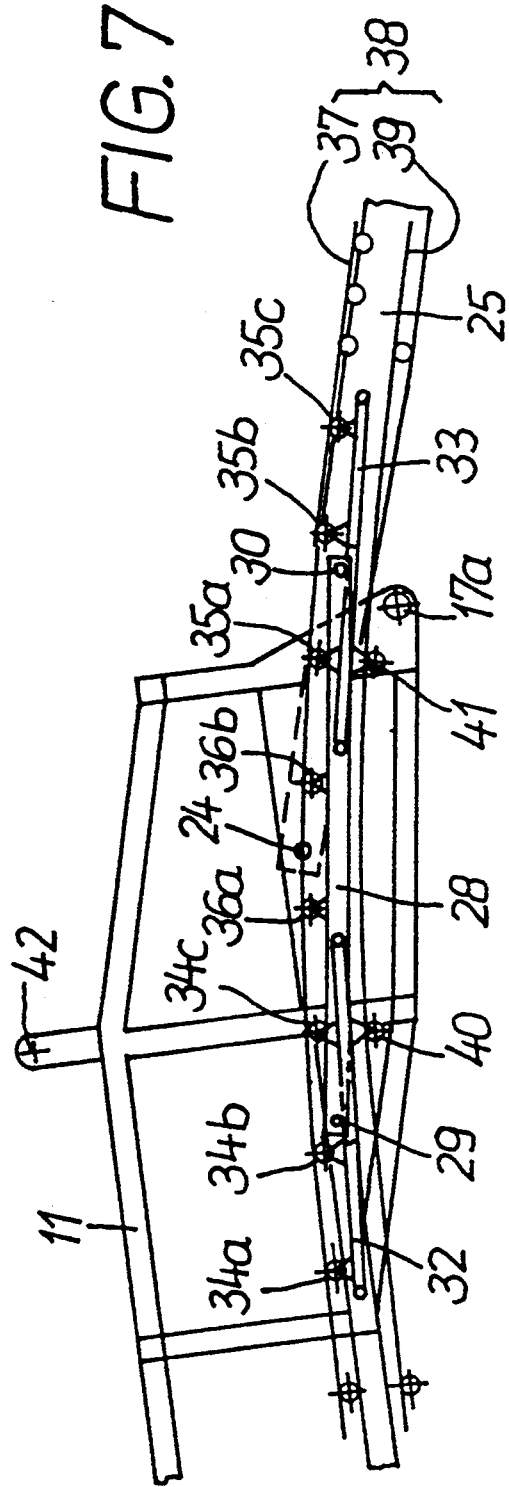
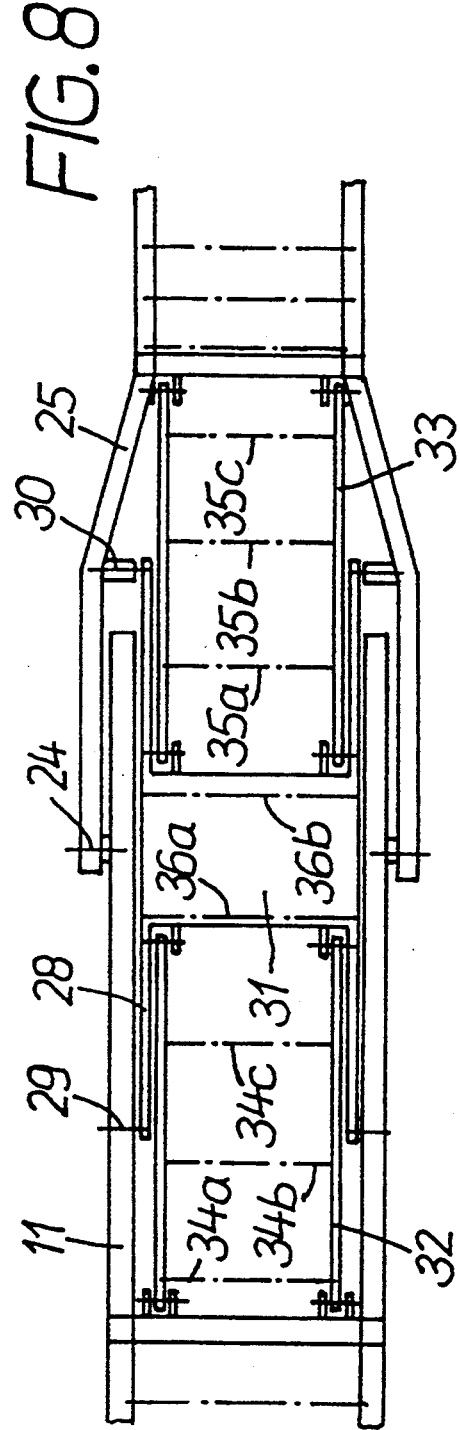

MOBILE CONNECTING BELT BRIDGE FOR OPEN PIT MINING

This is a national phase application of PCT/EP 93/00318 filed 10 February 1993 and based, in turn, on a German application P 42 05557.1 filed 24 February 1992 under the International Convention.

FIELD OF THE INVENTION

The invention relates to a mobile connecting belt bridge for open pit mining comprising one end on the feed side for being fed by a mining or winning apparatus and a discharge end for transferring conveyed material onto a pit level belt.

BACKGROUND OF THE INVENTION

Known connecting belt bridges are—optionally by way of an intermediate belt bridge-fed with a material to be conveyed either by a substantially-stationary winning apparatus (e.g. a bucket wheel excavator) or a crusher plant. Such connecting belt bridges either convey on the same level or in the form of elevator conveyors onto a higher level (of e.g. DE-OS 36 23 813). The known connecting belt bridges are substantially stationary and are only moved onwards once the feeding apparatus or the feeding plant undergoes a change in locality.

Linearly moving a winning or mining apparatus comprising an excavating means excavating in the direction of travel (of e.g. U.S. Pat. No. 3,897,109) is known from DE-OS 39 11 119 and this machine deposits the material which is excavated on the pit level belt by a belt arrangement comprising a plurality of mobile belt units. However the operation of such a belt arrangement requires considerable monitoring effort.

From DE-OS 39 20 011 a band bridge is furthermore known cardanically linked to a linearily moving winning apparatus and which at its discharge end is likewise cardanically linked to a funnel wagon travelling on the travelling rails of the pit level belt and movable jointly with the winning apparatus and the funnel wagon. However, this known belt bridge is permanently coupled to the winning apparatus and the pit level belt and therefore severely restricted in respect of its dimensions, in particular, in relation to level differences between the winning or excavation plane and the plane of the pit level belt.

OBJECT OF THE INVENTION

Accordingly a need exists to so improve a connecting belt bridge of the type referred to in the introduction, that it is suitable to be fed by the discharge belt of an excavating or winning apparatus and is linearly movable.

It is therefore an object of the invention to provide a connecting belt bridge overcoming drawbacks of the known connecting belt bridges. Yet another object of the invention is to provide the connecting belt bridge fed by the excavating or winning apparatus linearly movable both in a high level cut mode (excavation above the level of the pit level belt) as well as in a low level cut mode (excavation below the plane of thee pit level belt).

SUMMARY OF THE INVENTION

The present invention provides an apparatus wherein both the feed end as well as the discharge end of the bridge are each supported on a separate travelling means, the discharge end travelling means is of portal-like design comprising at each of both sides of the pit level belt at least one non-railborne travelling unit (e.g. a chain drive), the bridge on the travelling means at the discharge end is pivotal both about a vertical axis as well as a horizontal axis and on the feed side the travelling means is supported by way of a longitudinally displaceable single point support with a support beam which is horizontally alignable and the bridge at its feed end comprises a feed jib linked about a horizontal transverse axis.

The two travelling means permit unimpeded manoeuvring of the connecting belt bridge during a locality change. This is substantially contributed to by the fact that the travelling means on the discharge side comprise travelling units which are not railborne. By virtue of the three-point support the connecting belt bridge is suitable both for the high level cut as well as the low level cut of the winning apparatus. The linkage connection of the feed jib permits, moreover, to always provide the winning apparatus which feeds the material with a favorable feeding level both under high level cut as well as low level cut conditions.

One of the advantageous further embodiments has a connecting belt bridge in the linkage region of the feed jib which comprises a special carrier structure including three frame members including separate roller positions for the upper limb and the lower limb of the connecting belt which in the case of angular deflection of the feed jib provides a polygonal configuration for the belt path. This structure eliminates abrupt deflection and thereby disadvantageous stresses on the material of the connecting belt are avoided.

In order to always permit a smooth transfer of the material onto the pit level belt even at maximum travelling speed of the connecting belt bridge, provision is made for a feed carriage supported underneath the travelling means on the discharge side on the travelling rails of the pit level belt, providing the travelling means with mechanical means for moving along the feed carriage in the direction of travel and associating the travelling means with a regulating means for the steering thereof. The control of the travelling means on the discharge side is provided automatically as a function of the lateral distance between the travelling means (and accordingly the pit level belt) and the feed carriage within predeterminable permissible tolerances.

The mechanical means suitable for moving along preferably take the form of bumpers and appropriate counter-formations.

For steering the travelling means at the discharge end the control means comprises a directional signal generator which is preferably connected to a steering rod mechanism. The steering rod mechanism offers the advantage that the signal generator is linked to a short lever arm by which the large change in distance is converted into a smaller travelling signal.

Both the means for the (automatic) moving along of the feed carriage as well as the (automatic) steering of the travelling means on the discharge side as a function of the feed carriage allow operating personnel during the normal excavating operation, to be dispensed with at the discharge end of the connecting belt bridge.

In order to permit movement of the discharge end travelling means or a locality change of the connecting belt bridge independently of the pit level belt, the former comprises means for lifting the feed carriage off the travelling rail, thereby to cancel its railbound condition, after first having dismantled the feed mechanisms of the feed carriage. For additional freedom of movement provision is made to deflect the supporting legs of the feed carriage and fix them in the deflected position.

In order to enable the operating personnel to readily co-ordinate travelling of the connecting belt bridge with the winning apparatus, a horizontally alignable driver cab is provided close to the feed end of the connecting belt bridge. Normally the winning apparatus is driven by a combustion engine. If the winning apparatus is to be driven electrically an adjustable cable jib for a connecting cable to the winning apparatus is provided at the feed side end of the connecting belt bridge.

BRIEF DESCRIPTION OF THE DRAWING

The above and other objects, features, and advantages will become more readily apparent from the following description, reference being made to the accompanying drawing in which:

FIG. 7 is the linkage connection of the feed jib in a simplified side elevation, FIG. 8 is the linkage connection of the feed jib in a simplified plan view.

SPECIFIC DESCRIPTION

Figure 1:
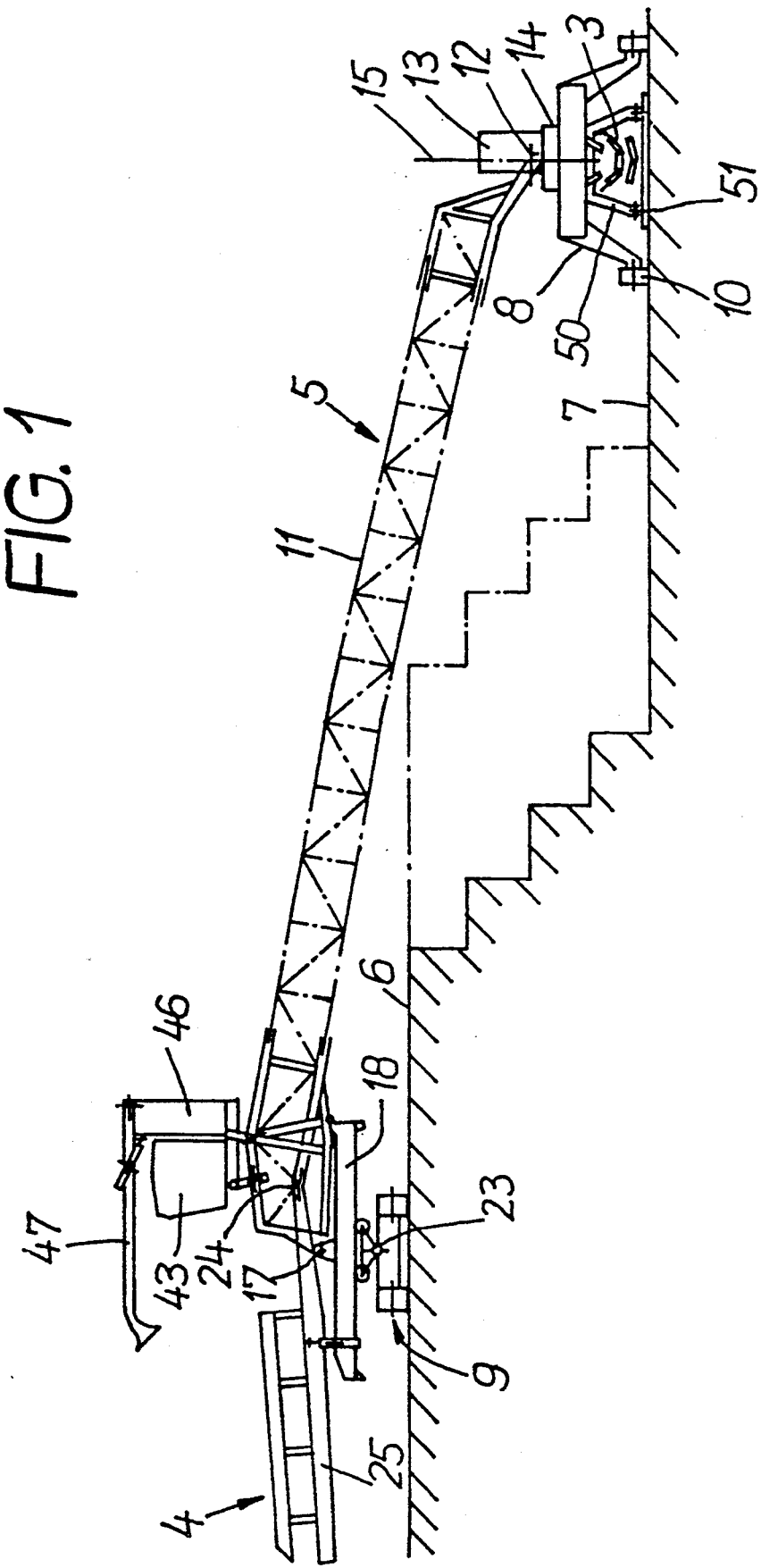
FIG. 1 is a diagrammatic view of view of a connecting belt bridge in high cutting mode.
Figure 2:
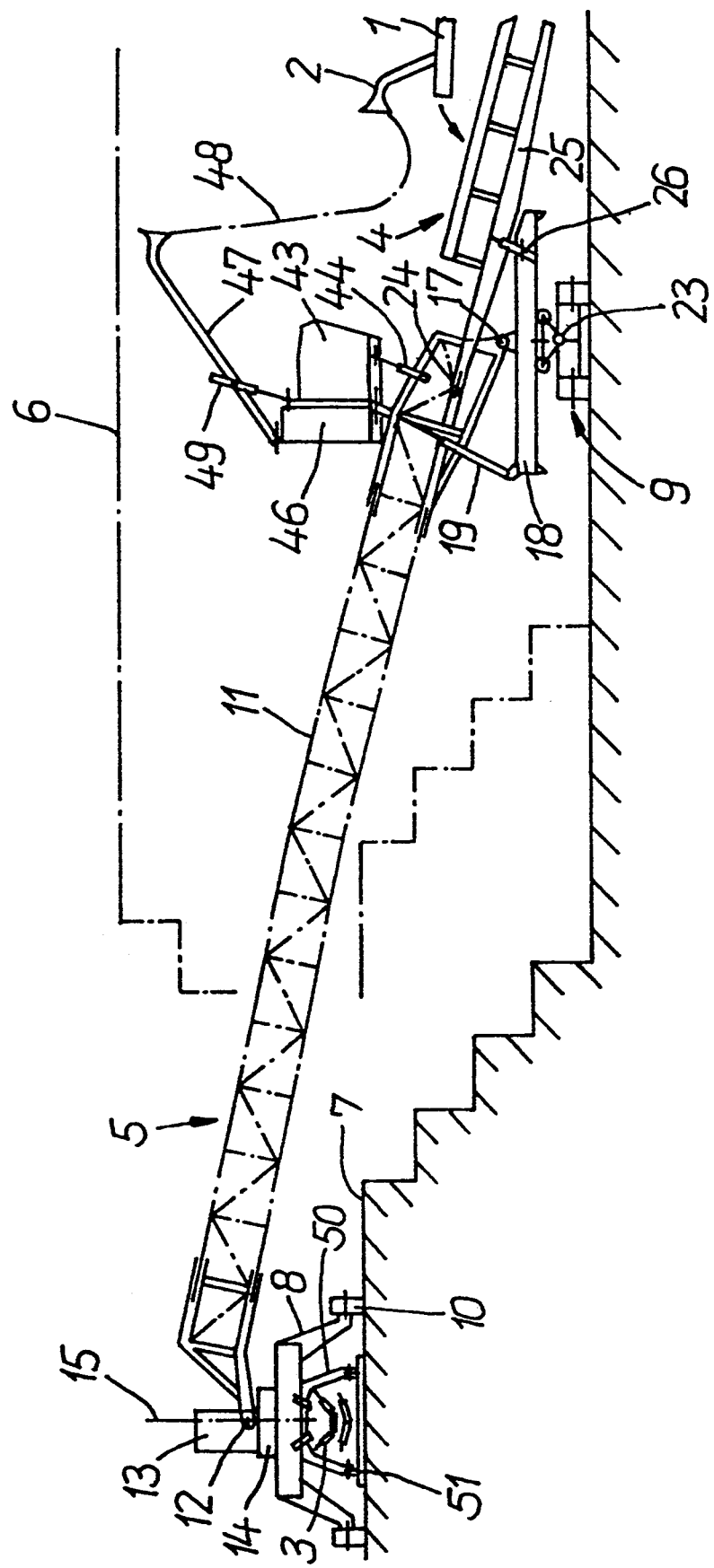
FIG. 2 is a diagrammatic view of the connecting belt bridge in low cutting mode.
Figure 3:
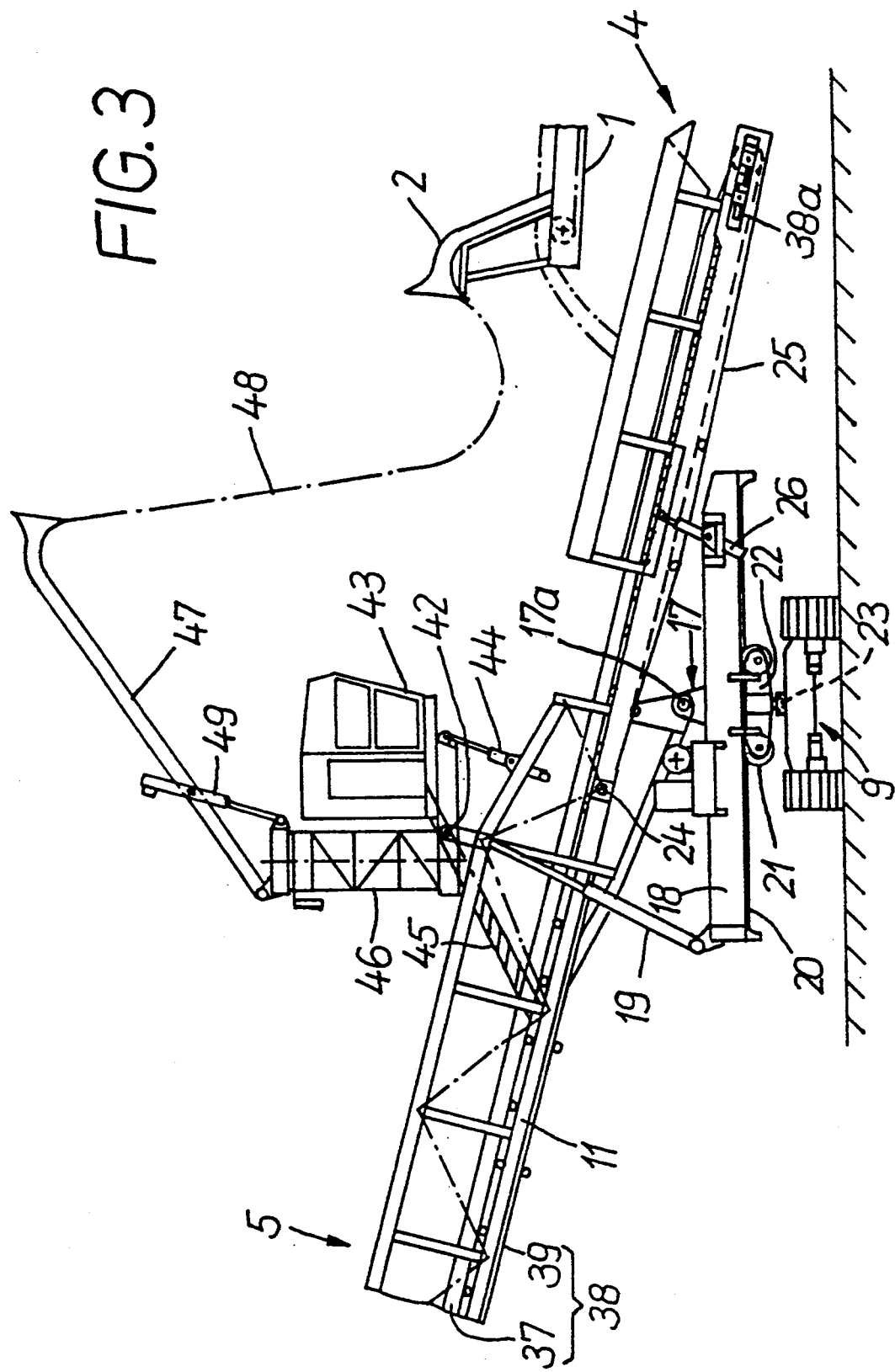
FIG. 3 is a diagrammatic view of the feed side end of the connecting belt bridge on a larger scale.

An excavating or winning apparatus illustrated in FIGS. 2 and 3 only in respect of its discharge jib 1 and its cable conduit 2 moves parallel to a pit level belt 3 and in doing so, picks up the material present in its own track (overburden, coal seam, mineral bed, etc.) and delivers this material by way of its discharge jib 1 onto the feed end 4-of a connecting belt bridge 5, which in mm conveys it to the pit level belt 3. The linearily moving excavator apparatus operates in relation to the plane of the pit level belt 7 which is lower than the original ground level 6, on the one hand in high cutting mode (FIG. 1), wherein it excavates the material down to the level 7 of the pit level belt 3 and on the other hand, on the opposite side of the pit level belt—under low cutting conditions (FIG. 2), wherein it excavates the material below the level 7 of the pit level belt 3.

The connecting belt bridge 5 moves jointly with the excavating apparatus, i.e. at the same velocity—independently of its particular direction—generally parallel to the pit level belt 3. For that purpose the connecting belt bridge is provided at both ends with respectively travelling means 8 and 9 . The travelling means 8 provided underneath the discharge end has a portal-like design and straddles the pit level belt 3. On each side the portal-like travel means 8 comprises an independent travelling unit 10 in the form of a chain (crawler) drive.

The excavating track most remote from the pit level belt 3 is determined by the length of the connecting belt bridge 5. If the excavating apparatus operates in an excavating track closer to the pit level belt 3, the connecting belt bridge 5 occupies in relation to the pit level belt 3 a position which—viewed in plan view—is appropriately oblique to the pit level belt 3.

The discharge end of the girder structure 11 of the connecting belt bridge 5 is supported on a support member 13—in a manner pivotal about a horizontal axis 12—and which is supported on a support member 13 which in turn is mounted by way of a pivoting connection 14 having a vertical pivoting or swivel axis 15, on the travelling means 8. The support member 13 also comprises a baffle plate 16 for deflecting the material being conveyed towards the pit level belt 3.

The feed end is supported in a linkage 17 (FIG. 3) comprising a horizontal axis 17a on a support beam 18. The support beam 18 at that end thereof which is directed towards the discharge end of the connecting belt bridge 5 is connected by way of hydraulic cylinders 19 to the girder structure 11 of the connecting belt bridge 5 so as to always permit horizontal positional alignment of beam 18. At its underside the support beam 18 comprises travelling rails 20 by means of which it rests on running rollers 21 of a transverse support 22. The transverse support 22 in turn is supported by way of a ball joint connection 23 along the chain track vehicle 9. Accordingly the support of the connecting belt bridge 5 at the discharge side end is effected at two points (on the axis 12) and at the feed side end in a single point (the ball joint connection 23), so that altogether a stable three-point support for the torsionally rigid girder structure 11 of the connecting belt bridge results. This furthermore ensures that the feed side travelling means 9 is enabled to travel by way of inclined ramps from the low level cutting plane onto the level of the pit level belt 7 respectively from there onto the high level cutting plane 6 and vice versa.

Close to the linkage 17 a feed jib 25 supported elsewhere by the support beams 18 is linked to hydraulic cylinders 26 and hinged about a further horizontal axis 24 to the girder structure 11. The hydraulic cylinders 26 are normally retracted. If the connecting belt bridge travels with its feed end above the plane 7 of the pit level belt, the feed jib 25 can be lifted by means of these cylinders if this becomes necessary due to edges of cuttings in the high cutting region. At the linkage point 24 the feed jib 25 embraces the girder structure 11 of the connecting belt bridge 5 in a bifurcated manner (cf FIG. 8).

A support construction in three parts as can be seen in FIG. 8 is provided about the linkage point 24 and constructed as is provided about the linkage point 24 constructed as follows:—

A central H-shaped frame member 28 is linked on one side at 29 to the girder structure 11 and on the other side at 30 to the feed jib 25. Between the central cross beam 31 of the H-shaped frame member 28 and the girder structure 11 on the one hand and the feed jib 25 on the other hand a rectangular frame member 32 respectively 33 is hinged on. The foremost and the rearmost frame member 32 respectively 33 each comprise three roller positions 34a to 34c and 35a to 35c respectively, the H-shaped central frame member comprises two roller positions 36a, 36b for the upper limb 37 of the conveyor belt 38 mounted on the connecting belt bridge 5. For the lower limb 39 of the conveyor belt the frame members 32, 33 each comprise a further roller position 40 respectively 41. In the event of the feed jib 25 being deflected in relation to the girder structure 11, there is no prominent deflection of the conveyor belt 38, but rather a gradual change and therefore a favorable transition.

At the feed end of the girder structure 11 a driver cab 43 is hinged on at 42 which by one or more hydraulic cylinders 44 is maintained in a horizontal position. The associated access step-ladder 45 is fitted with automatic means for keeping the step horizontal. Because the ascent and the descent of the belt curve in the region of flexing about the linkage point 24 affects the axial spacing of the conveyor belt 38 the belt tension is constantly monitored by way of (not illustrated) pressure measuring boxes and the conveyor belt 38 is automatically retensioned or relieved by hydraulic cylinders 38a (FIG. 3).

Behind the driver cab 43 on a pillar 46 a cable jib 47 is provided so as to pivot in an up and downward direction. From there a cable 48 proceeds for electricity supply to the excavator apparatus and enters there into a receiving structure or cable conduit 2 at the tip of the jib 1. The free length of the cable loop should be so dimensioned that the winning apparatus and the connecting belt bridge 5 are afforded freedom to perform all turning and evasion manoeuvres. During operational travelling, when both machines are in closest proximity to one another, the low hanging cable loop is kept out of the transfer region by lifting and pivoting away of the cable jib 47.

Underneath the portal-like travelling means 8 a smaller likewise portal-like feed carriage 50 (FIG. 6) is provided which travels on the transport rails 51 of the pit level belt 3. The feed carriage 50 comprises a rectangular chassis 52, laterally provided with inclined chute respectively guide baffles 53. The legs 54 of the feed carriage are hinged at 55 (FIG. 5) to lateral projections of the chassis 52 where they can be locked for the travelling position.

The movement respectively advancement of the feed carriage 50 is brought about by the travelling means 8 on the discharge side for which purpose transverse beams 56 provided on the travelling means 8 coact with bumpers 57 (FIG. 6) fitted to the chassis 52 of the feed carriage 50. Accordingly the travelling means 8 and the feed carriage 50 are mechanically releasably interconnected. In relation to the course of the pit level belt 3 they move synchronously and always occupy the same neutral position.

Figure 4:
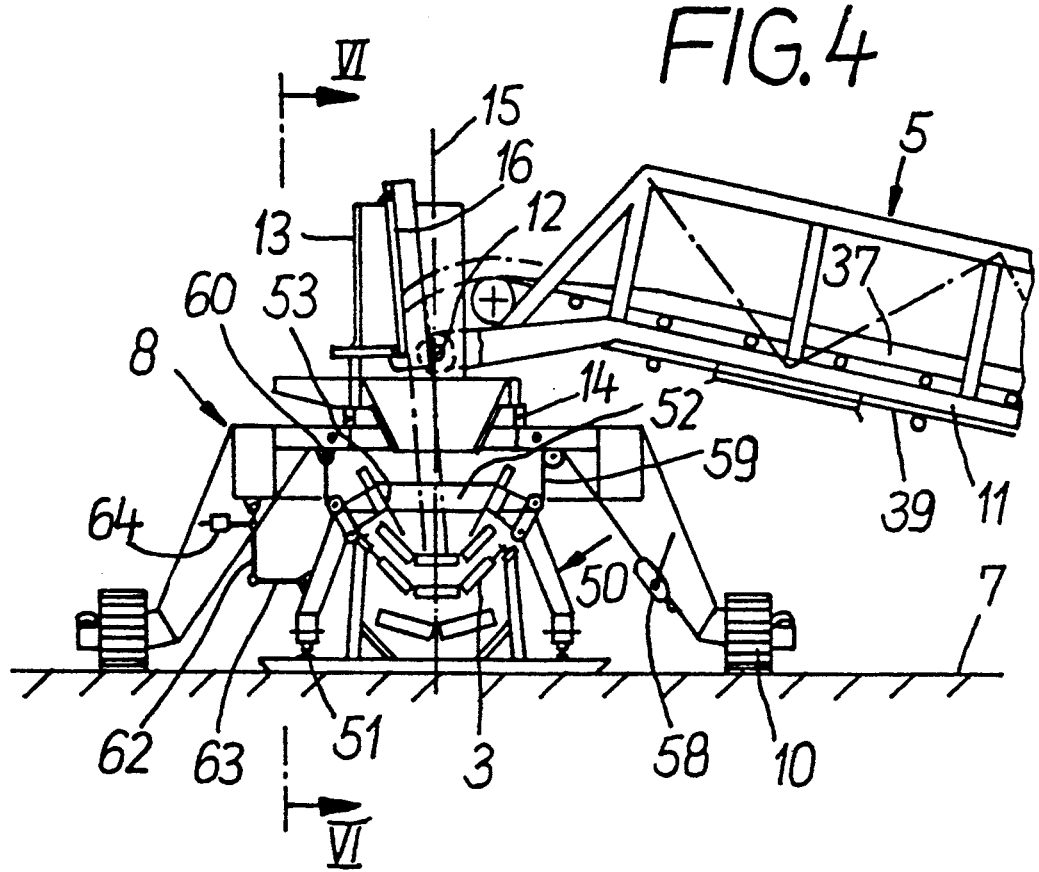
FIG. 4 is a diagrammatic view of the discharge side end of the connecting belt bridge on a larger scale.
Figure 5:
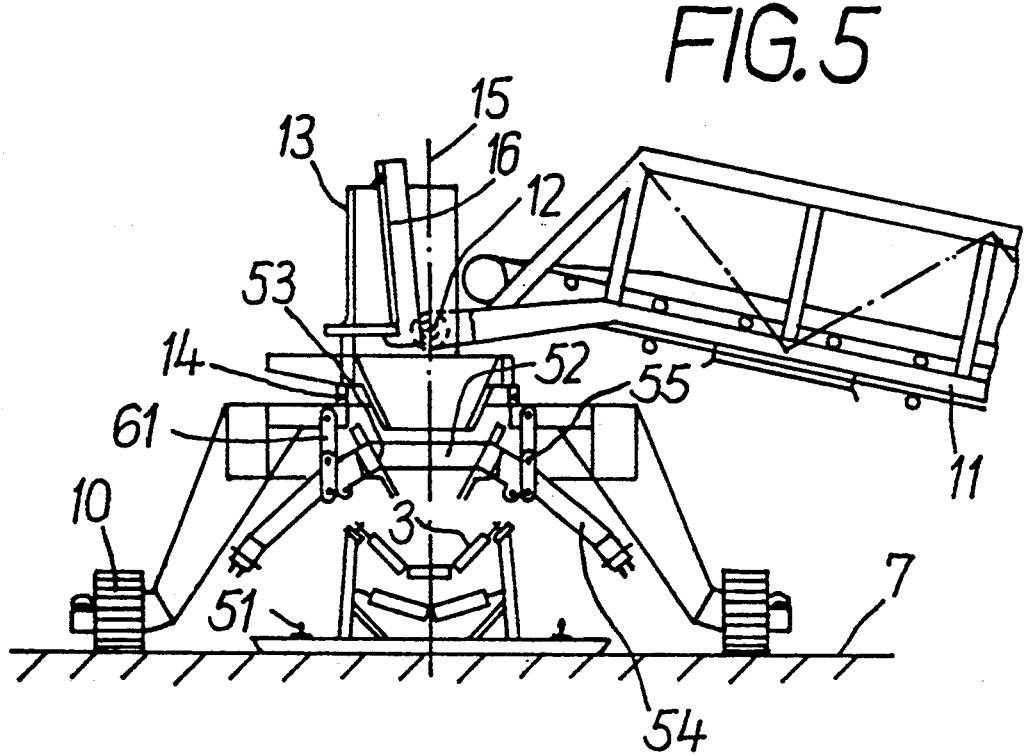
FIG. 5 is a diagrammatic view of the discharge side end of the connecting belt bridge with the feed carriage in a raised position ready for a change of locality.
Figure 6:
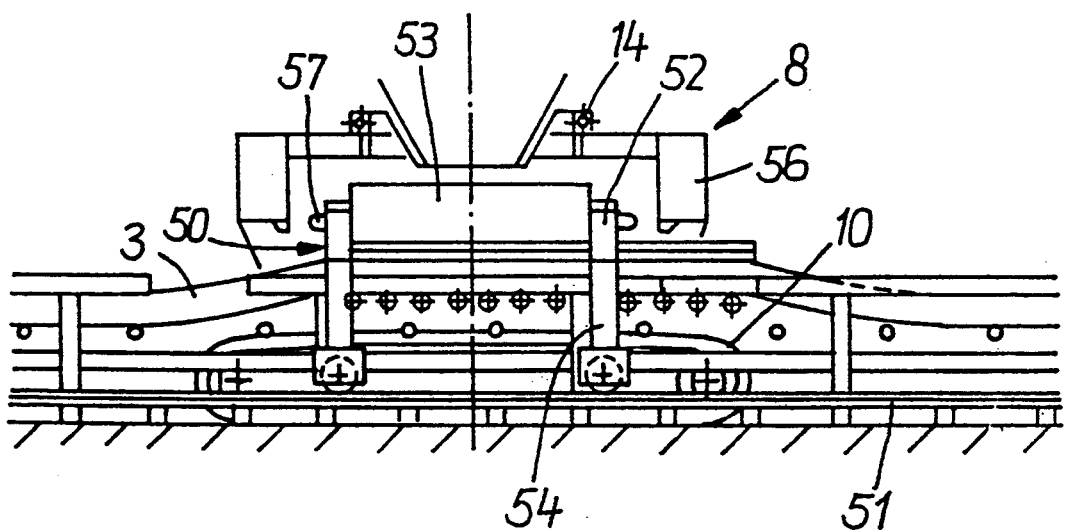
FIG. 6 is an elevational view of the discharge side end of the travelling means with the feed carriage in a section along the line VI—VI in FIG. 4.

The travelling means 8 is provided with a winch 58 (FIG. 4) operating a rope 59 suspended at its opposite end at 60 from the travelling means 8 and by means of which the feed carriage 50 can be lifted, so as to be suspended securely by shackles 61 from the travelling means 8 before the connecting belt bridge 5 performs a change in locality. On one side a linkage connection composed of two levers 62, 63 (FIG. 4) is provided between the feed carriage 50 and the travelling means 8. The movable part of a steering signal generator 64, the remainder of which is connected to the travelling means 8, is linked to a relatively short lever arm of the lever 62. If the distance between the discharge carriage 50 and the travelling means 8 determined on the side of the travelling sensor 64 becomes larger than the predetermined normal value, the travelling units 10 are steered to follow a curved or oblique direction such that the distance is decreased correspondingly.. If the said distance drops below a predetermined normal distance a corresponding steering in the reverse sense is brought about. While coacting with the winning apparatus the travelling means 8 of the connection belt bridge 5 accordingly travels automatically, essentially guided by the track, along the pit level belt 3. Only in the event of a locality change a second driver must steer the vehicle 8 (FIG. 5). In that case the connecting belt bridge 5 is disconnected from the normal electricity supply and the travel means are operated by way of an emergency power aggregate (not illustrated).

The travelling means 9 is steered from the driver cab 43. The driver retains contact to the winning apparatus and he steers the discharge jib 1 of the winning apparatus. The feed jib 25 is always kept in its lowest position in which the hydraulic cylinders 26 are not under load. They are only pressurised in the event of a risk of collision with a cutting. The evasion and turning manoeuvres of the connecting belt bridge 5 in the event of changes in cutting line and level and the movement required for changing the operating field (from high level to low level cutting) and travelling on the ramp are also conducted from the driver cab 43.

I claim:

1. A mobile connecting belt bridge for transporting a material between lower and upper levels during open pit mining, comprising:
   a feed station on one of the lower and upper levels and receiving a material to be conveyed in a conveying direction from a winning or mining apparatus, the feed station including:
      feed travel means for displacing the feed station,
      a ball joint mounted on the feed travel means,
      at least one elongated support beam having a bottom side operatively connected with the ball joint, the ball joint being displaceable longitudinally along the support beam,
      means for horizontally aligning the beam, and
      a linkage mounted on a top side of the support beam and having a pivot axis extending horizontally transversely to the conveying direction;
   a discharge station on the other of the upper and lower levels and spaced from the feed station along the conveying direction for transferring the material onto a pit level belt, the discharge station including:
      portal-like not-railborne travel means separate from the feed travel means and straddling the pit level belt for displacing the discharge station,
      a support member on the travel means, and
      pivotal means on the travel means for pivoting the support member about a vertical; and
   a connecting belt bridging the feed and discharge stations to convey the material therebetween and provided with a feed jib mounted pivotally about the pivot axis on the linkage, the discharge station further including swinging means for swinging an end of the connecting belt spaced from the feed jib about a respective axis extending parallel to the pivot axis.

2. The bridge defined in claim 1 wherein the jib includes a plurality of frame members hingedly connected with one another and each provided with respective roller means pressing against an upper limb and a lower limb of the conveying belt for displacing thereof along a polygonal path thereof along the conveying direction upon angular deflection of the jib.

3. The bridge defined in claim 1 wherein the discharge station further including:

a feed carriage mounted releasably on the travel means, displacing means for moving the feed carriage on at least one rail extending at the pit level belt under the port-like travel means, and control means for controlling a predetermined lateral distance between the feed carriage and the travel mens.

4. The bridge defined in claim 3 wherein the displacing means includes a plurality of bumpers and counterformations formed on the feed carriage.

5. The bridge defined in claim 3 wherein the control means includes a directional signal generator measuring a lateral distance between the port-like travel means and the feed carriage upon displacing the feed carriage along the rail.

6. The bridge defined in claim 5 wherein the port-like travel means includes a steering rod linkage.

7. The bridge defined in claim 3 wherein the discharge station further includes lifting means for lifting the feed carriage off the rail.

8. The bridge defined in claim 3 wherein the displacing means includes a chassis and a plurality of supporting legs on the chassis, the legs being adapted to be locked upon travelling of the carriage.

9. The bridge defined in claim 1 wherein the feed station further includes an adjustable cable jib.

10. The bridge defined in claim 1, further comprising a driver cab, and means for horizontally aligning the cab.

* * * * *